United States Patent
Padgett (10) Patent No.: US 10,047,523 B2
(45) Date of Patent: Aug. 14, 2018

(54) GUTTER HINGE ASSEMBLY

(71) Applicant: Richard G Padgett, Winter Garden, FL (US)

(72) Inventor: Richard G Padgett, Winter Garden, FL (US)

( * ) Notice: Subject to any disclaimer, the term of this patent is extended or adjusted under 35 U.S.C. 154(b) by 0 days.

(21) Appl. No.: 15/424,865

(22) Filed: Feb. 5, 2017

(65) Prior Publication Data

US 2017/0226742 A1    Aug. 10, 2017

Related U.S. Application Data

(60) Provisional application No. 62/292,195, filed on Feb. 5, 2016.

(51) Int. Cl.
| | | |
|---|---|---|
| *E04D 13/072* | (2006.01) | |
| *E04D 13/076* | (2006.01) | |
| *F16C 11/04* | (2006.01) | |
| *F16C 11/10* | (2006.01) | |

(52) U.S. Cl.
CPC ....... *E04D 13/0722* (2013.01); *E04D 13/076* (2013.01); *F16C 11/04* (2013.01); *F16C 11/10* (2013.01)

(58) Field of Classification Search
CPC .............. E04D 13/072; E04D 13/0722; E04D 13/0727; E04D 13/064; E04D 13/076
See application file for complete search history.

(56) References Cited

U.S. PATENT DOCUMENTS

| | | | | |
|---|---|---|---|---|
| 3,091,055 | A | | 5/1963 | Hegedusich |
| 3,616,582 | A | * | 11/1971 | Walek ............... E04D 13/076 248/48.1 |
| 4,014,074 | A | * | 3/1977 | Faye .................. E04D 13/076 16/392 |
| 4,199,121 | A | * | 4/1980 | Le Febvre .......... E04D 13/076 248/202.1 |
| 4,226,057 | A | | 10/1980 | Wolcott |
| 4,309,792 | A | | 1/1982 | Faye |
| 4,311,292 | A | | 1/1982 | Deason |
| 4,413,449 | A | * | 11/1983 | Faye .................. E04D 13/076 16/223 |
| 4,446,658 | A | | 5/1984 | Gouin |
| 4,561,616 | A | | 12/1985 | Robinson |
| 4,669,232 | A | | 6/1987 | Wyatt |

(Continued)

FOREIGN PATENT DOCUMENTS

| | | |
|---|---|---|
| WO | 2005047617 | 5/2005 |
| WO | 2006098656 | 9/2006 |

OTHER PUBLICATIONS

The Times News, A Better Gutter: Duo Hopes to Aid Homeowner with Pivoting Design, Apr. 17, 2015, available at: http://www.thetimesnews.com/article/20150417/Business/304179848 [admitted prior art].

(Continued)

*Primary Examiner* — Babajide A Demuren (57) ABSTRACT

An improved rain gutter hinge assembly uses mounting locations under an eave of building's roof to preserve integrity of fascia boards. In one embodiment, a gutter mounted to the gutter hinge assembly can be readily moved between a water collection position, a dumping position, and an under-eave storage position. The gutter can also be easily removed from the building.

17 Claims, 8 Drawing Sheets

(56) References Cited

U.S. PATENT DOCUMENTS

| | | | |
|---|---|---|---|
| 4,745,657 A | 5/1988 | Faye | |
| 4,813,190 A | 3/1989 | Wittig | |
| 4,837,987 A | 6/1989 | Fender | |
| 5,127,133 A * | 7/1992 | Brucker | E04D 13/0722 16/373 |
| 5,146,718 A | 9/1992 | Baskett | |
| 5,184,435 A | 2/1993 | Sherman | |
| 5,274,965 A | 1/1994 | Jackson | |
| 5,317,843 A | 6/1994 | Sheehan | |
| 5,335,460 A | 8/1994 | Smith, Jr. | |
| 5,406,756 A | 4/1995 | Bemis et al. | |
| 5,417,015 A | 5/1995 | Coyne | |
| 5,649,681 A | 7/1997 | Faye | |
| 5,752,347 A | 5/1998 | Osborn | |
| 6,233,876 B1 * | 5/2001 | Obidniak | E04D 13/064 248/48.2 |
| 6,240,679 B1 | 6/2001 | Smalara | |
| 6,389,755 B1 | 5/2002 | Wenner | |
| 7,152,376 B2 | 12/2006 | Wyatt | |
| 7,891,141 B2 | 2/2011 | Kennedy | |
| 8,234,819 B2 | 8/2012 | Petrov | |
| 9,181,706 B1 * | 11/2015 | Livers | E04D 13/076 |
| 2008/0289266 A1 | 11/2008 | Kennedy | |
| 2011/0067319 A1 | 3/2011 | Anthony | |
| 2011/0239547 A1 * | 10/2011 | Port | E04D 13/064 52/16 |

OTHER PUBLICATIONS

Nanda Products, Nanda Pivoting Gutter System, viewed on May 18, 2015 at http://www.nandaproducts.com/ [admitted prior art].

Flipclean Gutter Systems, FlipClean Gutter Systems—The smart thing to do!, video viewed at http://www.flipcleanguttersystems.com/ on May 18, 2015 [admitted prior art].

* cited by examiner

GUTTER HINGE ASSEMBLY

CROSS-REFERENCE TO RELATED APPLICATIONS

This application claims the benefit of U.S. provisional application No. 62/292,195 filed on Feb. 5, 2016.

BACKGROUND

Field of Invention

The invention relates generally to a gutter (or trough) disposed adjacent to an edge of a roof for collecting and directing rain water and the like. More specifically, but not by way of limitation, embodiments of the invention provide a hinge assembly that is adapted to support such a gutter in two or more alternative positions.

Description of the Related Art

Gutters typically cooperate with downspouts to direct rain water run-off from building roofs to desired locations. Unfortunately, gutters can become clogged with leaves, ice, or other debris. When this occurs, gutter systems can be ineffective at re-directing water, and structural damage to the gutter system and/or building can result.

Known solutions have many shortcomings. Manually unclogging of gutters, for example with the aid of a ladder, can be time consuming and dangerous. Screens and other partial covers configured to filter debris at a top side of a gutter do not solve the problem because they also clog over time. Known hinged gutter systems that facilitate dumping of debris are undesirable because they typically require the attachment of hardware to fascia boards, which can lead to wood rot. Moreover, known movable gutter systems provide a limited range of functional configurations.

SUMMARY OF THE INVENTION

The invention seeks to overcome one or more of the limitations described above. In embodiments of the invention, an improved gutter hinge assembly uses mounting locations under an eave to preserve the integrity of the fascia boards. In addition, embodiments of the invention support water collection, dumping of debris, under-eave storage, and easy removal of a mounted gutter assembly.

BRIEF DESCRIPTION OF THE DRAWINGS

Embodiments of the invention are described with reference to the following drawings, wherein.

DETAILED DESCRIPTION

Embodiments of the invention are described with reference to FIGS. 1-14. Such embodiments are meant to be illustrative and not restrictive. Reference designators are reused for the same or similar features. Features in the figures are not necessarily drawn to scale. Some features illustrated in the drawings may be exaggerated in scale. Other features may be simplified or omitted for descriptive clarity. Although section titles are used below for organizational convenience, the description of any feature is not necessarily limited to any section of this specification.

System Overview

Figure 1:
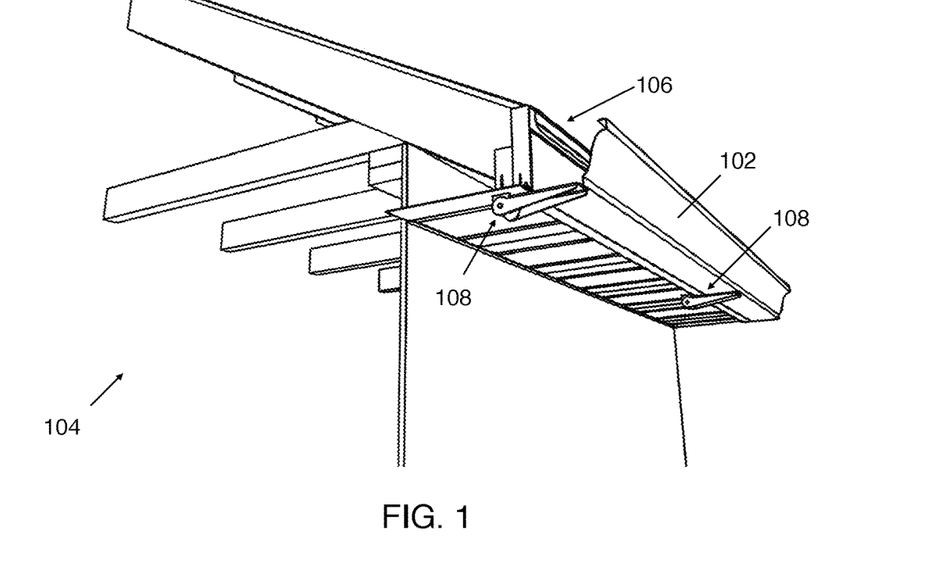
FIG. 1 is a perspective view of a gutter system, according to an embodiment of the invention.

FIG. 1 is a perspective view of a gutter system, according to an embodiment of the invention. As shown therein, a gutter 102 is disposed on a building 104 to collect rain water from a surface of a roof 106. The gutter 102 may be manufactured, for instance, from aluminum or vinyl, may have a collection channel on the order of 5 or 6 inches wide, and may extend several feet in length. The gutter 102 is not restricted to the aforementioned materials or example dimensions. In the illustrated embodiment, the gutter 102 is mounted via multiple gutter hinge assemblies 108. The quantity of gutter hinge assemblies 108 used with the gutter 102 may vary according to the length, material, and gauge of the gutter 102. One or more downspouts are preferably disposed in fluid communication with the gutter 102, but are omitted from FIG. 1 for descriptive clarity of other features.

Figure 2:
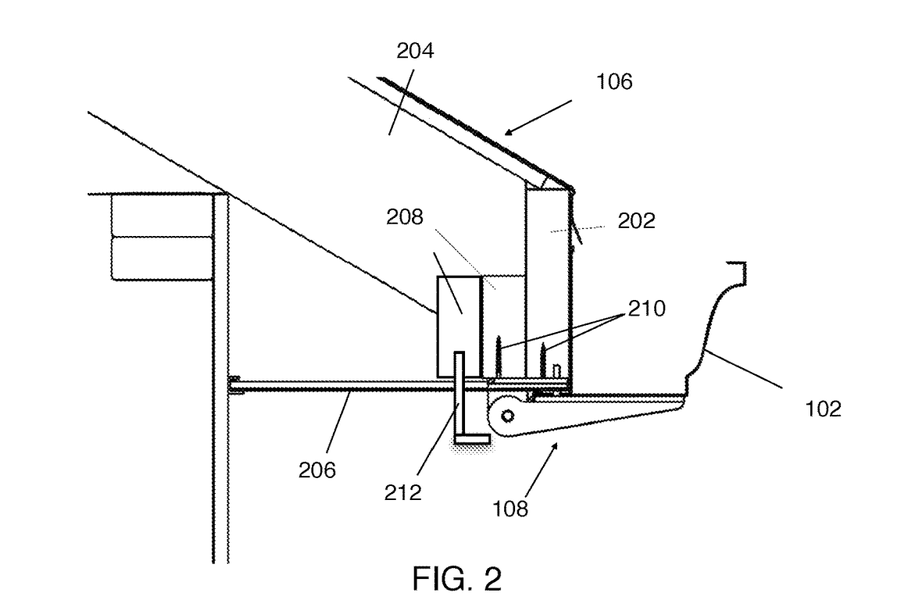
FIG. 2 is a sectional view of a gutter system, according to an embodiment of the invention.

FIG. 2 is a sectional view of a gutter system, according to an embodiment of the invention. As shown therein, the roof 106 is constructed with rafters 204 that terminate with a fascia board 202. A portion the roof 106 that overhangs the edge of the building 104 defines an eave, and a soffit 206 covers an underside of the eave. A gutter hinge assembly 108 is affixed to a bottom side of the fascia board 202 and a scab 208 via wood screws 210. The utility of locking bolt 212, which is optional, will be discussed below. A benefit apparent with reference to FIG. 2 is that no mounting hardware penetrates the exposed face of the fascia board 202. This is advantageous because hardware penetrations provide a pathway for moisture and can lead to wood rot.

Figure 11:
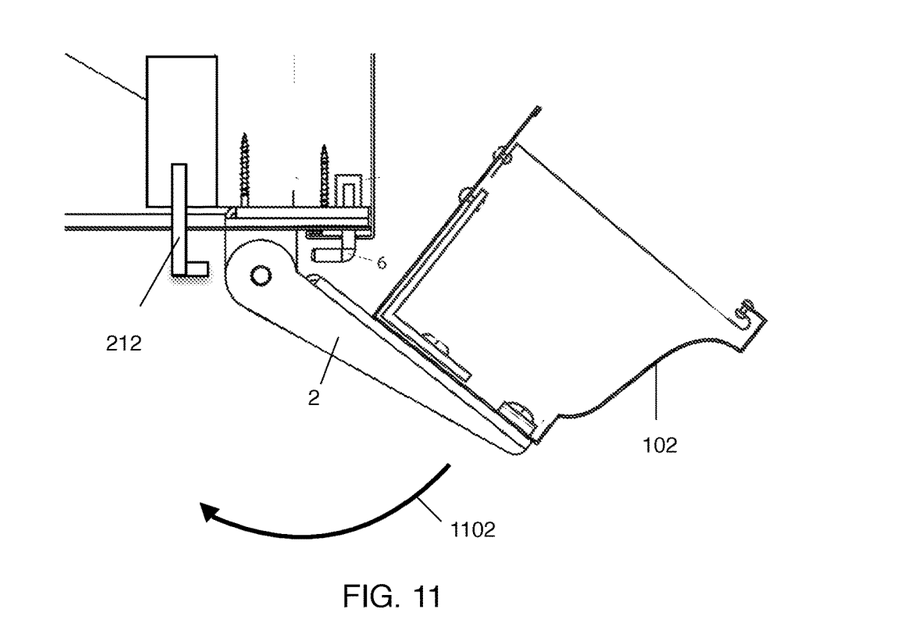
FIG. 11 is a sectional view of a gutter system in transition from a water collection position to a dumping position, according to an embodiment of the invention.
Figure 12:
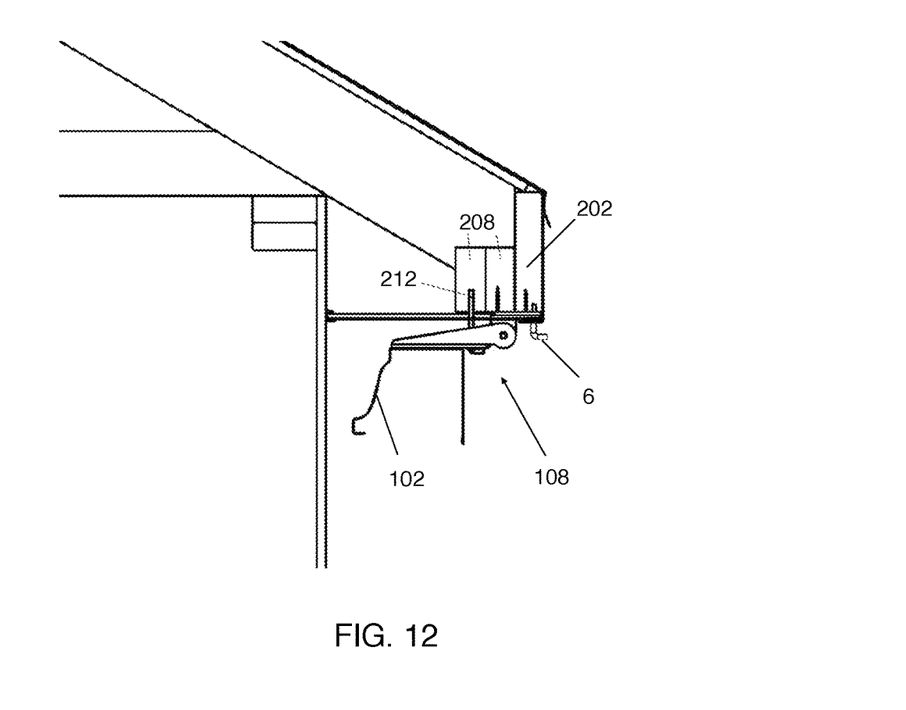
FIG. 12 is a sectional view of a gutter system in an under-eave storage position, according to an embodiment of the invention.

Variations of the configuration illustrated in FIG. 2 and described above are possible. For example, alternative implementations may require no scabs, a single scab, or more than two scabs, depending upon dimensions of the fascia board 202, whether a locking bolt 212 is required, and other factors. In an alternative embodiment, the gutter hinge assembly 108 could be fastened solely to one or more scab boards 208 without a direct connection to the fascia board 202. Alternatives exists for the locking bolt 212; for example, the locking bolt 212 could be an anchor bolt (as illustrated in FIGS. 2, 11, and 12), a thumb screw, a bolt with a "T" handle or eyelet, or other locking member.

Gutter Hinge Assembly

Figure 3:
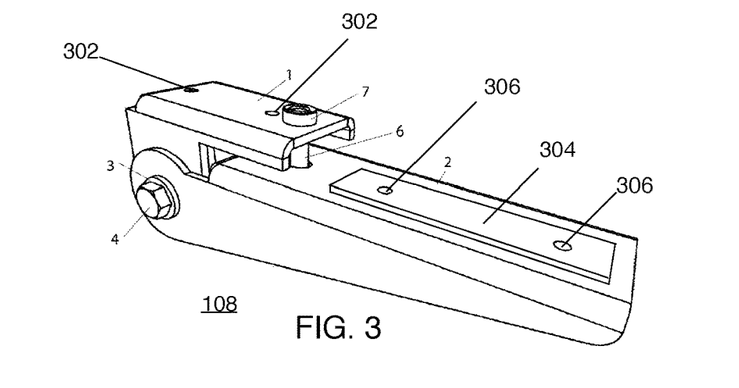
FIG. 3 is a perspective view of a gutter hinge assembly, according to an embodiment of the invention.

FIG. 3 is a perspective view of a gutter hinge assembly, according to an embodiment of the invention. In the illustrated embodiment, a anchor 1 is coupled to a gutter support 2 via a hinge bolt 4. The anchor 1 and gutter support 2 are preferably manufactured from aluminum. The hinge bolt 4 is threaded through a washer 3 and affixed to a corresponding washer and nut (not visible). The anchor 1 includes mounting holes 302 and swage nut 7. The swage nut 7 could be, for instance, a PEM® nut or other threaded insert. The gutter support 2 includes mounting holes 306. A shim 304 may be disposed on a surface of the gutter support 2 for reasons explained below. A locking bolt 6 cooperates with the swage nut 7 and a slot 402 (best viewed in FIG. 4) in the gutter support 2. When the locking bolt 6 is engaged in both the swage nut 7 and slot 402, the gutter support 2 cannot articulate with respect to the anchor 1 about the hinge bolt 4.

Figure 4:
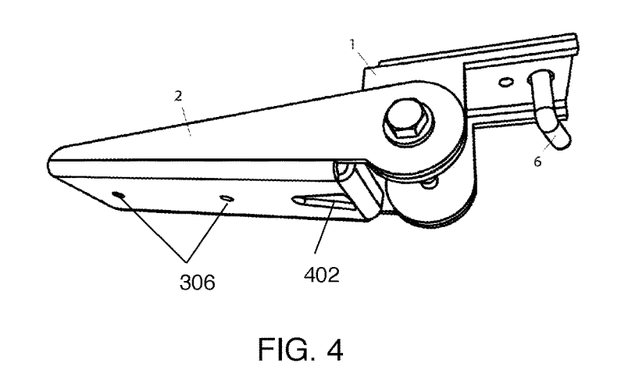
FIG. 4 is a perspective view of a gutter hinge assembly, according to an embodiment of the invention.

Variations of the gutter hinge assembly illustrated in FIGS. 3 and 4 and described above are possible. For example, steel, plastic, or other materials could be used to manufacture the anchor 1 and/or gutter support 2, according to design choice. Washer 3 may not be required. Alternatives exists for the locking bolt 6; for example, the locking bolt 6 could be an anchor bolt (as illustrated in FIG. 4), a thumb screw, a bolt with a "T" handle or eyelet, or other locking member. Depending upon selections for the material and gauge of the anchor 1, the anchor 1 could be threaded to accept the locking bolt 6 directly, eliminating a need for the swage nut 7.

Figure 5:
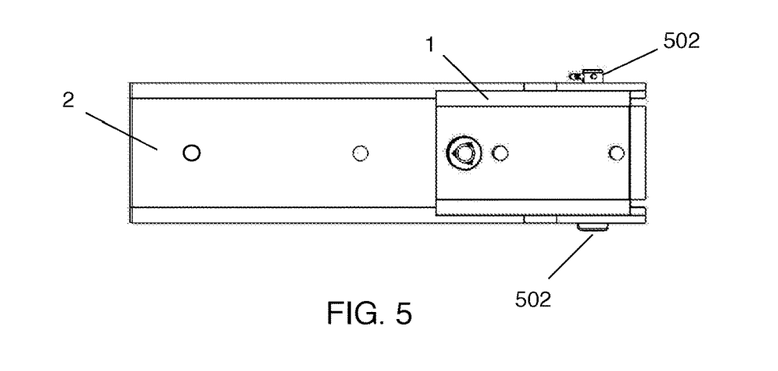
FIG. 5 is top view of a gutter hinge assembly illustrating alternative hinge hardware, according to an embodiment of the invention.

FIG. 5 is top view of a gutter hinge assembly illustrating alternative hinge hardware, according to an embodiment of the invention. FIG. 5 illustrates that hinge bolt 4 could be replaced with a clevis pin 502. Such a clevis pin 502 could be a locking type or a quick-release type, may be used in combination with washers (not shown), and may or may not include a lanyard. A clevis pin 502 may be beneficial over a hinge bolt 4 and nut (not shown) because a clevis pin 502 facilities faster removal of a mounted gutter 102 from a building 104. As used herein, a hinge pin could be a hinge bolt 4 and nut, a clevis pin 502, or other equivalent device that movably couples the gutter support 2 to the anchor 1.

Mounting Detail

Figure 6:
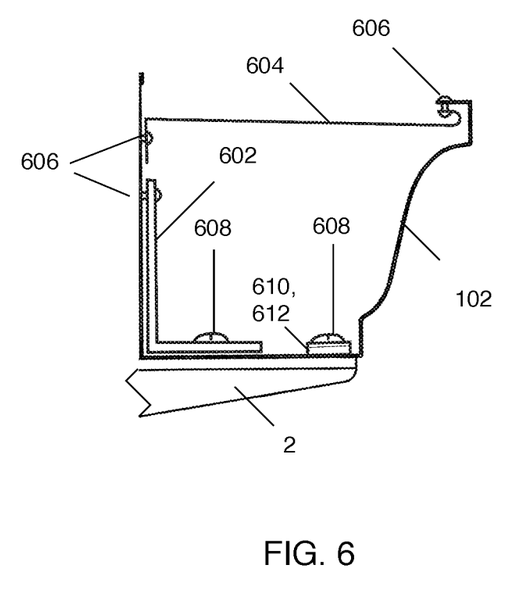
FIG. 6 is detailed sectional view of a portion of a gutter system, according to an embodiment of the invention.

FIG. 6 is detailed sectional view of a portion of a gutter system, according to an embodiment of the invention. As shown therein a support angle 602 having a L-shaped cross section may be connected to the gutter 102 via rivets 606 and screws 608. The support angle 602 may be, for instance, aluminum angle at a thickness of 0.090 inches. A short side of the support angle 602 may be 1.75 inches wide, and a long side of the support angle 602 may be 3.25 inches wide. The support angle 602 may extend several feet in length, as necessary, to limit bowing and twisting of the gutter 102. These representative dimensions for the support angle 602 are not intended to be restrictive. One or more hidden hangers 604 may be disposed at a mouth of the gutter 102 and affixed to the gutter 102 with rivets 606 as an additional feature to limit deformation of the gutter 102. Screws 608 secure the gutter assembly to the gutter support 2. In the illustrated embodiment, selected screws 608 are threaded through washers 610 and locknuts 612 (not visible).

Installation Method

Figure 7:
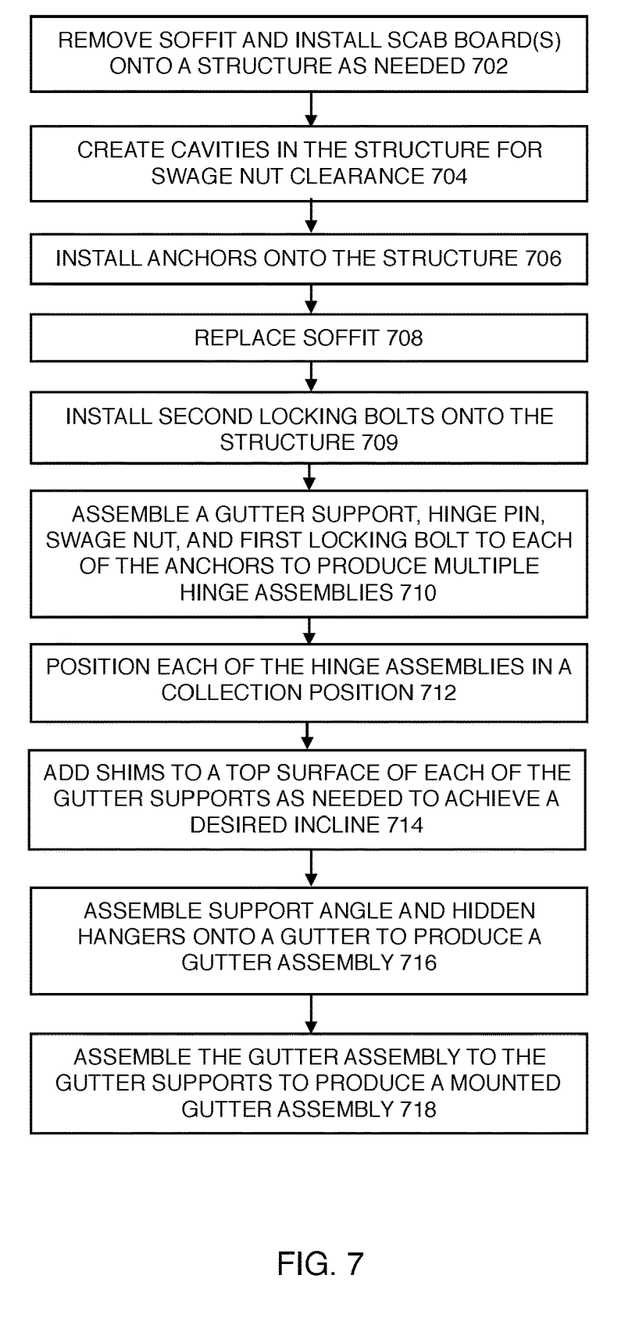
FIG. 7 is flow diagram of a gutter system installation method, according to an embodiment of the invention.

FIG. 7 is flow diagram of a gutter system installation method, according to an embodiment of the invention. The method begins in step 702 by removing soffit 206 and installing scab board(s) 208 as needed. In step 704, cavities are created in the structure (for instance, a bottom side of fascia board 202) for swage nut 7 clearance. Next, in step 706, anchors 1 are installed onto the structure (e.g., in the bottom side of the fascia board 202 and scab 208). In step 708, the soffit 206 is replaced (with necessary cutouts for protruding features of the anchor 1 and locking bolt 212); in step 709, the second locking bolt 212 may be installed onto the structure (i.e., on an underside of the eave with access through an opening in the soffit 206). Then, in step 710, a gutter support 2, hinge pin, and locking bolt 6 are assembled to each anchor 1 to produce multiple gutter hinge assemblies 108. Each of the gutter hinge assemblies 108 are disposed in a collection position in step 712, and shims 304 are added to the mounting surface of the gutter support 2 (as illustrated in FIG. 3) as needed to achieve a desired incline of the gutter 102 in step 714. In step 716, support angle 602 and hidden hangers 604 are assembled onto a gutter 102 (as needed) to produce a gutter assembly. Finally, in step 718, the gutter assembly is assembled to the gutter supports 2, for instance using screws 608, washers 610 and locknuts 612, to produce a mounted gutter assembly. Step 718 may also include using sealant or gaskets to prevent leaking from a bottom side of the gutter 102.

Variations to the method illustrated in FIG. 7 and described above are possible. For instance, in alternative embodiments, steps 702, 708, 709, 714, and/or 716 may not be required. As an example, soffit removal and replacement in steps 702 and 708 may not be required where a soffit does not exist. Moreover, the sequence of some steps can be changed; for example, assembly step 716 could be performed at any time prior to assembly step 718.

Repositioning Method and Tools

The disclosed gutter hinge assembly preferably enables switching between multiple alternative gutter system positions or configurations: collection, dumping, storage or removal. Not all configurations must be enabled, however. FIGS. 8-14 illustrate alternative gutter system positions and provide methods and tools for switching between such positions.

Figure 8:
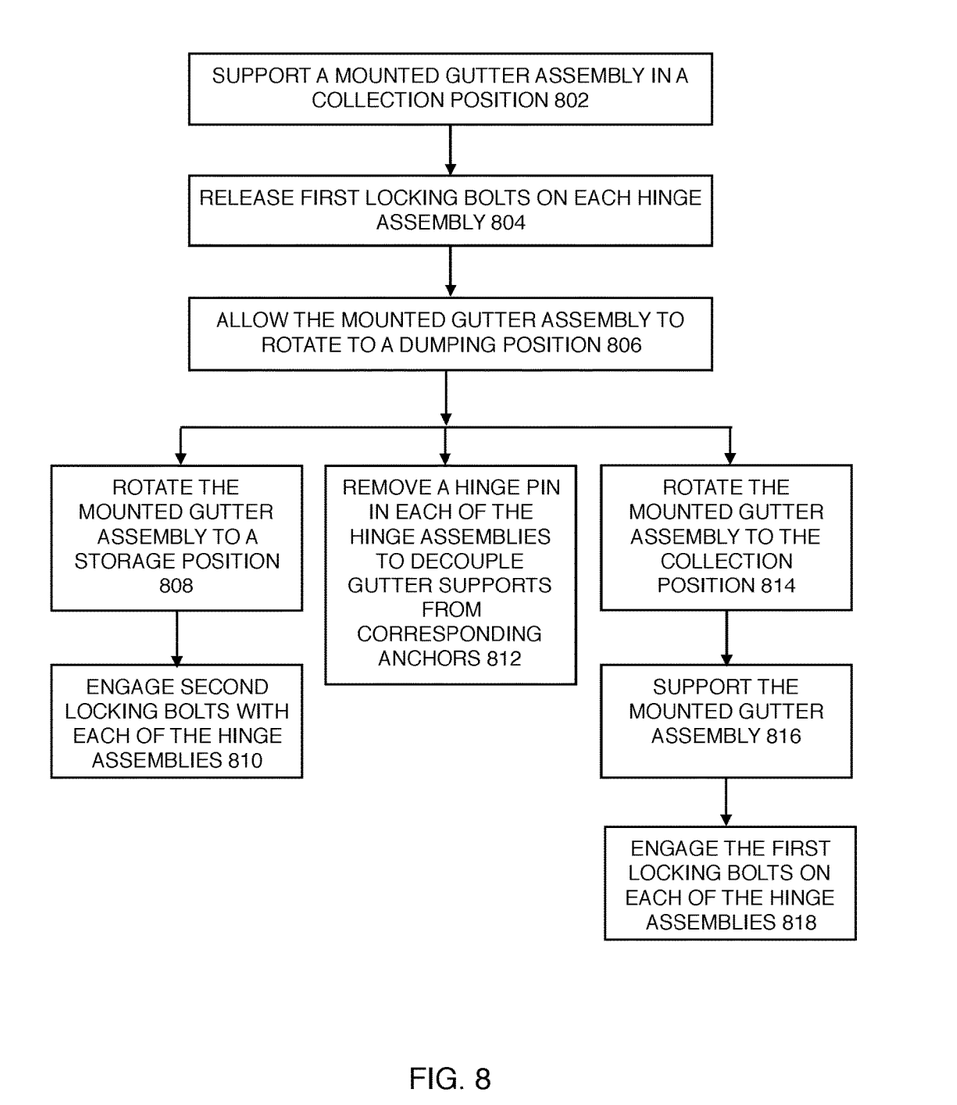
FIG. 8 is a flow diagram of a gutter system reconfiguration method, according to an embodiment of the invention.
Figure 9:
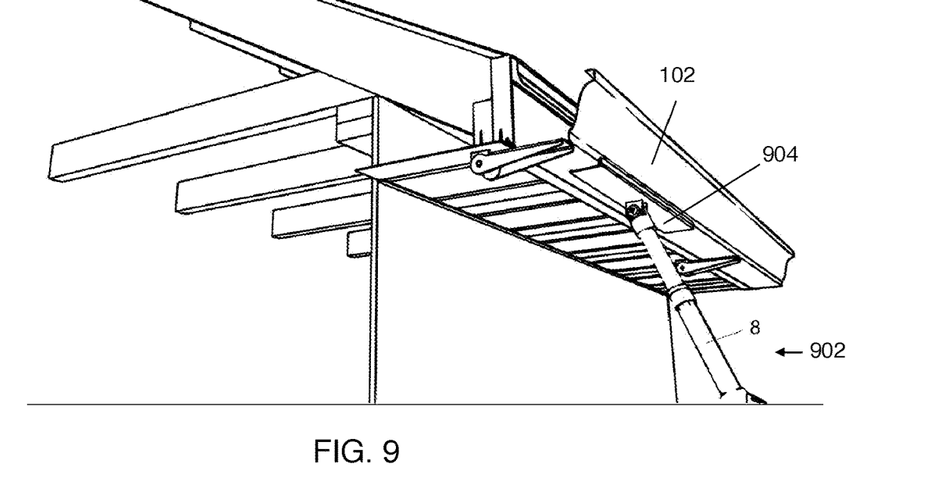
FIG. 9 is a perspective view of a support tool for use with a gutter system, according to an embodiment of the invention.

FIG. 8 is a flow diagram of a gutter system repositioning method, according to an embodiment of the invention. As shown, the method begins in step 802 by supporting a mounted gutter assembly in a collection position. FIGS. 1, 2, and 9 illustrate a collection position, and FIG. 9 further illustrates a support tool that could be used in step 802. The support tool 902 includes a (preferably telescopic) pole 8 movably coupled to a cradle 904. The cradle 904 is shaped to cooperate with outer contours of the gutter 102, and may include a rubber or other soft contact surface to protect the finish of the gutter 102.

Figure 10:
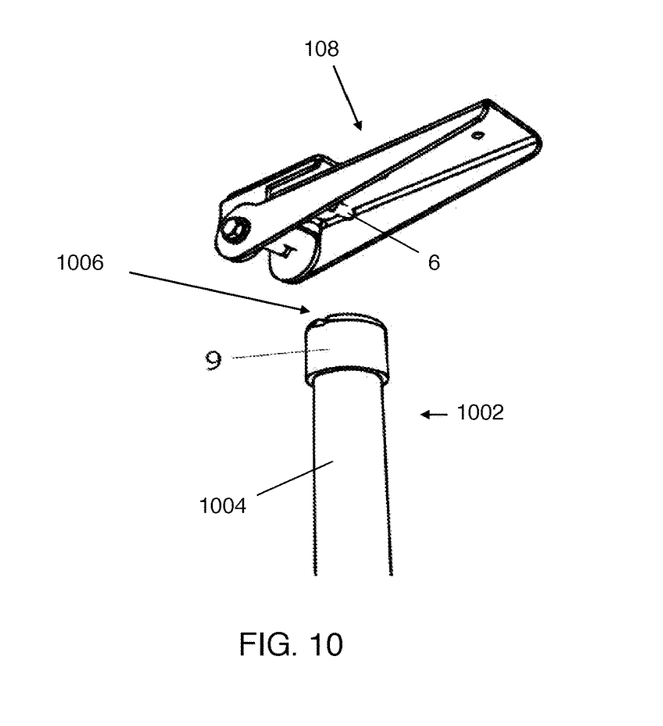
FIG. 10 is a perspective view of a locking/unlocking tool for use with a gutter system, according to an embodiment of the invention.

In step 804, locking bolt 6 is released on each gutter hinge assembly 108. An exemplary locking/unlocking tool for use in step 804 is illustrated in FIG. 10. The locking/unlocking tool 1002 includes a (preferably telescopic) pole 1004 with a cap 9. The cap 9 include a slot 1006 that is shaped to cooperate with contours of the gutter support 2 and the locking bolt 6 such that the locking bolt 6 can be rotated.

The mounted gutter assembly is permitted to rotate to a dumping position in step 806 simply by removing the support tool 902. Gravity will cause rotation in direction 1102 (illustrated in FIG. 11) and terminate in a dumping position.

From the dumping position, a user can place the gutter system in an under-eave storage position, remove a substantial portion of the gutter system from the building 104, or return the gutter system to the collection position, as will be described further below.

Figure 13:
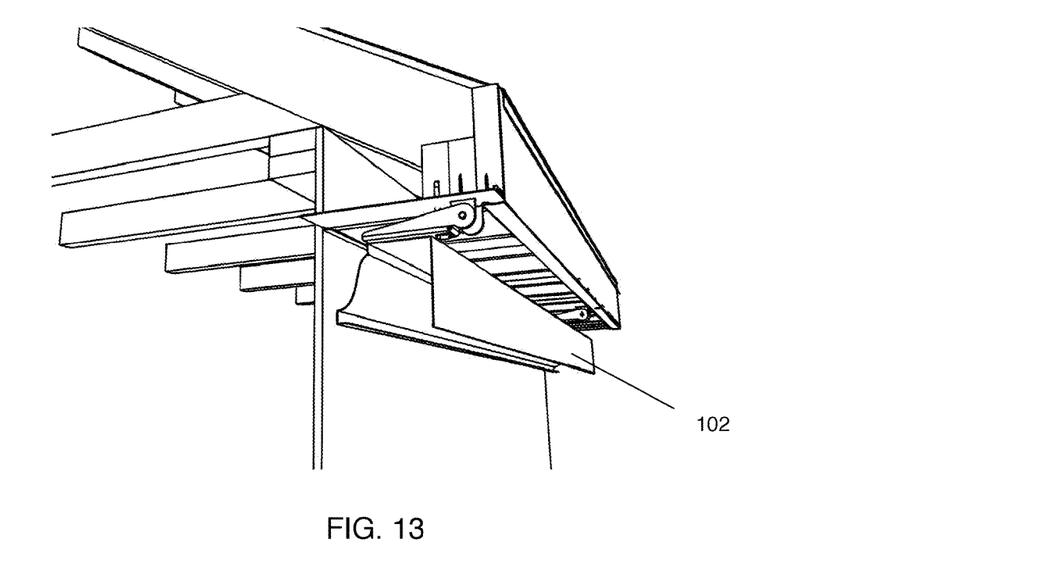
FIG. 13 is a perspective view of a gutter system in an under-eave storage position, according to an embodiment of the invention.

To store the gutter system under the eave, the mounted gutter assembly is further rotated (in direction 1102) to a storage position in step 808, and locking bolts 212 are engaged in slots 402 of corresponding gutter supports 2. FIGS. 12 and 13 provide sectional and perspective views, respectively, of the storage position. In alternative embodiments, a swing hook or other latching component coupled to an exterior wall of the building 104 or a location proximate to the soffit could cooperate with a mounted gutter assembly. Such a swing hook or other latching hardware would not have to use slot 402 or locking bolt 212 to secure the mounted gutter assembly in the under-eave storage position.

Figure 14:
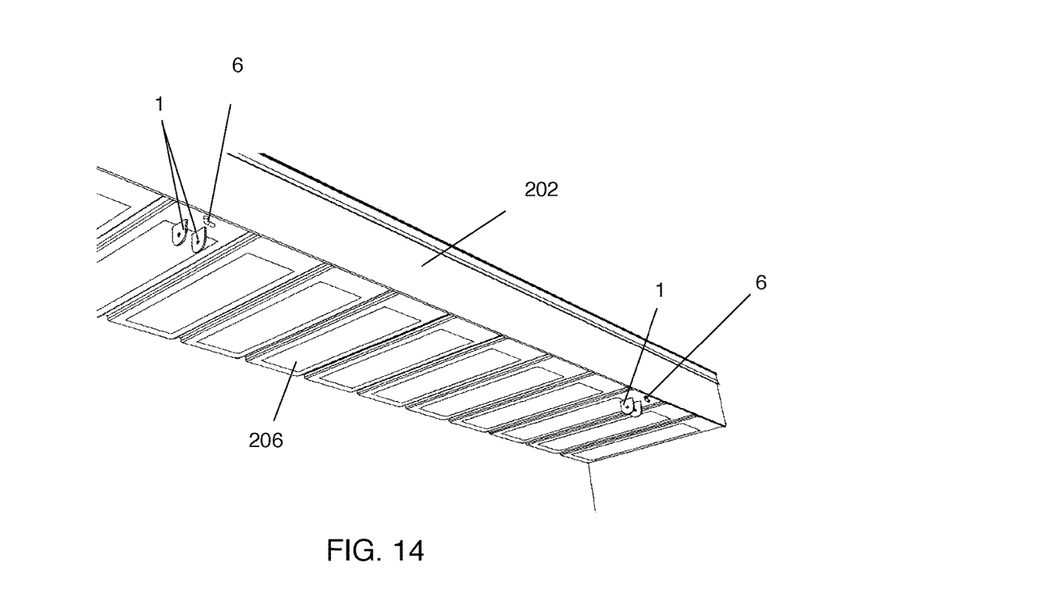
FIG. 14 is a perspective view of visible hardware that remains when a mounted gutter assembly is removed, according to an embodiment of the invention.

To remove a substantial portion of the gutter system in step 812, hinge pins (e.g., hinge bolt 4 or clevis pin 502) are removed in each of the gutter hinge assemblies 108. FIG. 14 is a perspective view of visible hardware that remains when a mounted gutter assembly is removed, according to an embodiment of the invention. In the illustrated embodiment, the locking pin 212 is removed. At the user's option, the locking pin 6 could also be removed.

To return the gutter system to the collection position, the mounted gutter assembly is rotated to the collection position in step 814, the gutter assembly is supported (e.g. using the support tool 902 as illustrated in FIG. 9) in step 816, and the first locking bolt 6 is engaged on each of the hinge assemblies 108 (e.g. using the locking/unlocking tool 1002).

CONCLUSION

Embodiments of the invention thus reduce or eliminate the need for ladders to manually clean debris from gutters (after installation), preserve the integrity of fascia boards, and provide a variety of alternative gutter positions to improve the overall utility of a gutter system. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention.

I claim:

1. A gutter system comprising:
   an anchor;
   a gutter support adapted to be connected to a gutter;
   a hinge movably coupling the anchor to the gutter support; and
   a locking member comprising a threaded portion coupled to the anchor that receives a threaded member configured to releasably engage the gutter support, wherein the threaded member is rotatable relative to the gutter support from a first position where it engages and fixes the gutter support in a collection position to a second position where the threaded member disengages the gutter support so the gutter support is movable to a dumping position by gravity.

2. The gutter system of claim 1, wherein the hinge is a hinge pin comprising hinge bolt and a nut.

3. The gutter system of claim 1, wherein the hinge is a clevis pin.

4. The gutter system of claim 1, wherein the locking member is an anchor bolt.

5. The gutter system of claim 1, wherein the locking member comprises a swage nut coupled to the anchor, the threaded member of the locking member being received in the swage nut.

6. The gutter system of claim 1, wherein the anchor is adapted to be mounted to an underside of an eave.

7. The gutter system of claim 6, further comprising a second locking member adapted to be mounted to the underside of the eave and configured to optionally engage the gutter support to fix the gutter support in a gutter storage position.

8. The gutter system of claim 7, wherein the second locking member is an anchor bolt.

9. The gutter system of claim 1, further comprising a gutter coupled to the gutter support.

10. The gutter system of claim 9, further comprising a shim disposed between the gutter and support.

11. A method for using the gutter system of claim 9 comprising:
    supporting the gutter in the collection position;
    rotating the threaded member of the locking member to release it from engagement with the gutter support; and
    allowing the gutter and the gutter support to rotate with respect to the anchor to the dumping position.

12. The method of claim 11, wherein supporting the gutter in the collection position includes contacting the gutter with a support tool, the support tool having a pole movably coupled to a cradle, the cradle being shaped to cooperate with a contour of the gutter.

13. The method of claim 11, wherein rotating the threaded member of the locking member includes using an unlocking tool, the unlocking tool having a pole and an unlocking feature disposed on the pole, the unlocking feature configured to cooperate with the threaded member of the locking member.

14. The method of claim 12, wherein allowing the gutter to rotate to the dumping position includes separating the support tool from the gutter.

15. The method of claim 11, further comprising:
    rotating the gutter and the gutter support to a gutter storage position under an eave; and
    engaging a second locking member with the gutter support, the second locking member being mounted to an underside of the eave.

16. The method of claim 11, further comprising removing the hinge to decouple the gutter support from the anchor.

17. A gutter system comprising:
    a gutter;
    an anchor adapted to be attached to a building;
    a gutter support connectable to the gutter;
    a locking member comprising a threaded portion coupled to the anchor that receives a threaded member that is rotatable between a first position where it engages the gutter support and a second position where it does not engage the gutter support; and
    a tool comprising a pole and an end that is shaped to engage the threaded member, whereby a user may use the tool to rotate the threaded member to the second position where the gutter support can move relative to the anchor.

* * * * *